(12) United States Patent
Jang et al.

(10) Patent No.: US 10,684,903 B2
(45) Date of Patent: Jun. 16, 2020

(54) APPARATUS AND OPERATING METHOD FOR MONITORING MICRO CONTROLLER UNIT HAVING MULTI-CORE

(71) Applicant: Hyundai Autron Co., Ltd., Seoul (KR)

(72) Inventors: Dong On Jang, Uiwang-si (KR); Hyung Min Park, Seoul (KR); Yeon Ho Kim, Seoul (KR); Jae Hyuck Woo, Osan-si (KR); Ji Haeng Lee, Hwaseong-si (KR); Won Hee Jo, Goyang-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 144 days.

(21) Appl. No.: 16/000,640

(22) Filed: Jun. 5, 2018

(65) Prior Publication Data

US 2018/0357118 A1 Dec. 13, 2018

(30) Foreign Application Priority Data

Jun. 7, 2017 (KR) .................. 10-2017-0070610

(51) Int. Cl.
*G06F 11/00* (2006.01)
*G06F 11/07* (2006.01)
*G06F 11/14* (2006.01)

(52) U.S. Cl.
CPC ........ *G06F 11/0757* (2013.01); *G06F 11/076* (2013.01); *G06F 11/0724* (2013.01); *G06F 11/1441* (2013.01)

(58) Field of Classification Search
CPC ............... G06F 11/0757; G06F 11/076; G06F 11/0724; G06F 11/1441; G06F 11/182;
(Continued)

(56) References Cited

U.S. PATENT DOCUMENTS 8,090,982 B2    1/2012 Inoue et al.
8,091,014 B2*   1/2012 Mochida ............ G05B 19/0428
                                                714/47.1
(Continued)

FOREIGN PATENT DOCUMENTS

JP    2011-159136 A    8/2011
JP    2015-103052 A    6/2015
(Continued)

OTHER PUBLICATIONS

Asakura, et al., Machine translation of applicant's cited art JP2015103052 (Year: 2015).*

*Primary Examiner* — Marc Duncan
(74) *Attorney, Agent, or Firm* — Morgan, Lewis & Bockius LLP

(57) ABSTRACT

Provided is an operating method of a monitoring device configured to monitor a microcontroller unit including a plurality of cores. The operating method includes: transmitting a question message to a first core among the plurality of cores; receiving an answer message from a second core among the plurality of cores; determining whether an operation of the microcontroller unit is abnormal, by using the answer message; receiving answer messages from cores, except for the second core, among the plurality of cores when the operation of the microcontroller unit is abnormal; and detecting an error of each of the plurality of cores by using the received answer messages.

14 Claims, 9 Drawing Sheets

(58) Field of Classification Search
CPC .. G06F 11/184; G06F 11/188; G06F 11/2242; G06F 11/2236; G06F 11/0739; G06F 11/0751; G05B 19/058; G05B 2219/25158

See application file for complete search history.

(56) References Cited

U.S. PATENT DOCUMENTS

2005/0268178 A1* 12/2005 Hagman ............ G05B 19/0428
714/47.1
2014/0149809 A1* 5/2014 Bisht ................. G05B 19/0428
714/55

FOREIGN PATENT DOCUMENTS

| KR | 10-2007-0063791 A | 6/2007 |
| KR | 10-1534974 B1 | 7/2015 |

* cited by examiner

FIG. 2

Main Core Q/A

| Question | Answer |
|---|---|
| 1 | 3 |
| 2 | 4 |
| 3 | 2 |
| 4 | 5 |
| 5 | 6 |
| 6 | 1 |

1st Sub-Core Q/A

| Question | Answer |
|---|---|
| 1 | A |
| 2 | B |
| 3 | C |
| 4 | D |
| 5 | E |
| 6 | F |

2nd Sub-Core Q/A

| Question | Answer |
|---|---|
| A | 1A |
| B | 2B |
| C | 3C |
| D | 4D |
| E | 5E |
| F | 6F |

APPARATUS AND OPERATING METHOD FOR MONITORING MICRO CONTROLLER UNIT HAVING MULTI-CORE

CROSS-REFERENCE TO RELATED APPLICATIONS

This US non-provisional patent application claims priority under 35 USC § 119 to Korean Patent Application No. 10-2017-0070610, filed on Jun. 7, 2017, the entirety of which is hereby incorporated by reference.

TECHNICAL FIELD

Embodiments of the present disclosure relate to a monitoring device for monitoring a microcontroller unit including multi-core and an operating method of the same.

BACKGROUND

An electronic control unit (ECU) is control units configured to control and manage main assemblies of a vehicle. Among ECUs, a multi-core ECU may include an ECU core configured to control and manage assemblies, a peripheral control processor (PCP) core configured to monitor and evaluate functional defects of the ECU core, and a watchdog device independently configured to control the ECU. In general, a watchdog device is disposed inside a vehicle and implemented according to the ISO26262 standard.

SUMMARY

The present disclosure provides a monitoring device to improve reliability of a monitoring operation on a core in a multi-core system and an operating method of the monitoring device.

Example embodiments of the present disclosure provide an operating method of a monitoring device configured to monitor a microcontroller unit including a plurality of cores. The operating method includes: transmitting a question message to a first core among the plurality of cores; receiving an answer message from a second core among the plurality of cores; determining whether an operation of the microcontroller unit is abnormal, by using the answer message; receiving answer messages from cores, except for the second core, among the plurality of cores when the operation of the microcontroller unit is abnormal; and detecting an error of each of the plurality of cores by using the received answer messages.

In example embodiments, the first core may be a main core and the second core may be a sub-core.

In example embodiments, each of the plurality of cores may include a question-answer circuit. The question-answer circuit may receive an answer message from a question-answer circuit of an adjacent core as a question message, operate an answer message in response to the received question message, and transmit the operated answer message to a question-answer circuit of another adjacent core.

In example embodiments, the operating method may further include: resetting a corresponding core when the number of the errors is greater than or equal to a first reference value.

In example embodiments, the operating method may further include: setting a flag to a corresponding core or resetting the corresponding core when the number of the errors is greater than or equal to a second reference value.

In example embodiments, the operating method may further include: monitoring an answer time until the answer message is received after the question message is transmitted.

In example embodiments, the operating method may further include: determining that the operation of the microcontroller unit is abnormal when the answer time is greater than or equal to a predetermined value.

In example embodiments, the operating method may further include: selecting a core, among the plurality of cores, to perform a monitoring operation.

Example embodiments of the present disclosure provide a multi-core system. The multi-core system includes: a microcontroller unit including a main core and sub-cores; and a monitoring device configured to monitor an operation of the microcontroller unit. Each of the main core and the sub-cores may include a question-answer circuit receiving a question message to generate an answer message. An answer message of a first core among the main core and the sub-cores may become a question message of a second core different from the first core. The monitoring device may perform a monitoring operation on a selected one of the main core and the sub-cores according to a question-answer scheme.

In example embodiments, the monitoring device may conduct communication with the microcontroller unit according to a serial communication scheme.

In example embodiments, the monitoring device may transmit a question message to the main core, receive an answer message of one of the sub-cores, determine whether the received answer message is a wrong answer, and receive answer messages from the other cores when the received answer message is a wrong answer.

In example embodiments, the monitoring device may further include: a watchdog timer configured to monitor a time from when a question message is received from the main core to when an answer message is received from the one sub-core.

In example embodiments, question-answer circuits of the main core and the sub-cores may generate answer messages to question messages in different manners.

In example embodiments, the microcontroller unit may further include: a watchdog selection register configured to store information on a selected core to perform a monitoring operation from the monitoring device among the main core and the sub-cores.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

FIG. 2 illustrates tables associated with operations of question-answer circuits in FIG. 1.

DETAILED DESCRIPTION

Figure 1:
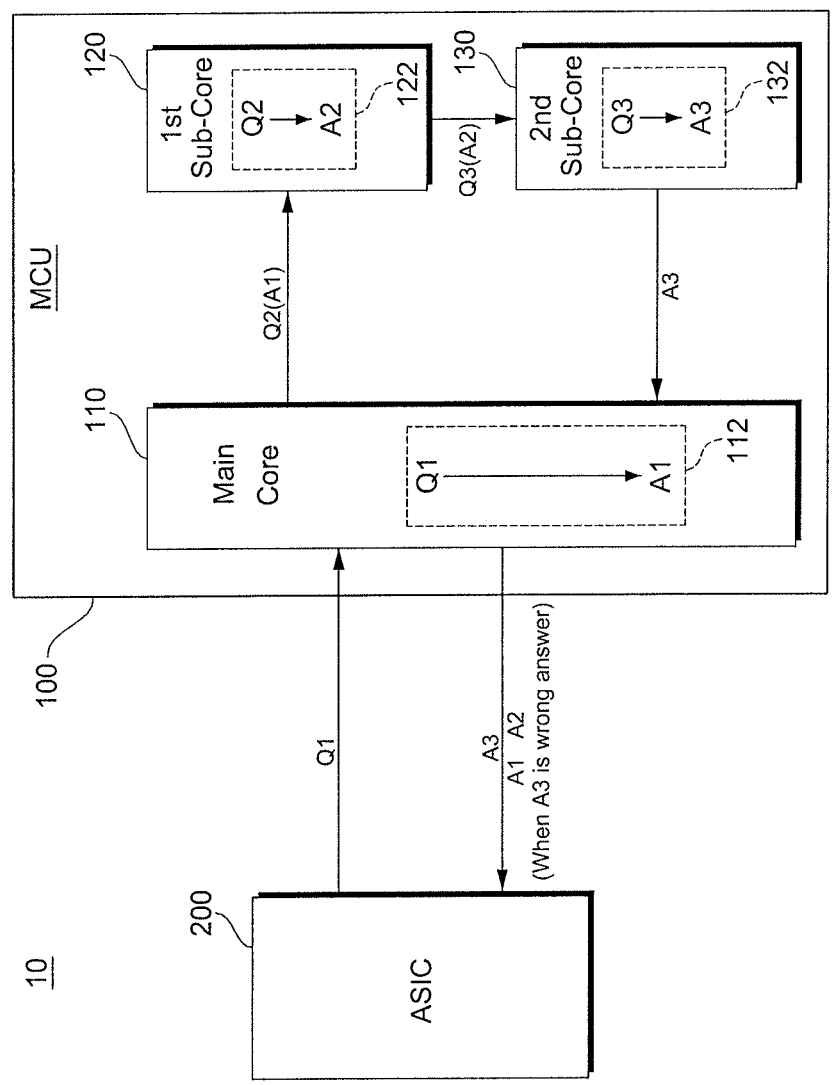
FIG. 1 illustrates a multi-core system according to an example embodiment of the present disclosure.

The advantages and features of the present disclosure and methods of achieving them will be apparent from the following exemplary embodiments that will be described in more detail with reference to the accompanying drawings. It should be noted, however, that the present disclosure is not limited to the following exemplary embodiments, and may be implemented in various forms. Accordingly, the exemplary embodiments are provided only to disclose the present disclosure and let those skilled in the art know the category of the present disclosure.

In the specification, it will be understood that when an element is referred to as being "on" another layer or substrate, it can be directly on the other element, or intervening elements may also be present. In the drawings, thicknesses of elements are exaggerated for clarity of illustration.

Exemplary embodiments of the invention will be described below with reference to cross-sectional views, which are exemplary drawings of the invention. The exemplary drawings may be modified by manufacturing techniques and/or tolerances. Accordingly, the exemplary embodiments of the invention are not limited to specific configurations shown in the drawings, and include modifications based on the method of manufacturing the semiconductor device. For example, an etched region shown at a right angle may be formed in a rounded shape or formed to have a predetermined curvature. Therefore, regions shown in the drawings have schematic characteristics. In addition, the shapes of the regions shown in the drawings exemplify specific shapes of regions in an element, and do not limit the invention. Though terms like a first, a second, and a third are used to describe various elements in various embodiments of the present disclosure, the elements are not limited to these terms. These terms are used only to tell one element from another element. An embodiment described and exemplified herein includes a complementary embodiment thereof.

The terms used in the specification are for the purpose of describing particular embodiments only and are not intended to be limiting of the invention. As used in the specification, the singular forms "a", "an" and "the" are intended to include the plural forms as well, unless the context clearly indicates otherwise. It will be further understood that the terms "comprises" and/or "comprising", when used in the specification, specify the presence of stated features, integers, steps, operations, elements, and/or components, but do not preclude the presence or addition of one or more other features, integers, steps, operations, elements, components, and/or groups thereof.

The present disclosure will now be described more fully hereinafter with reference to accompanying drawing, in which example embodiments of the present disclosure are shown.

FIG. 1 illustrates a multi-core system 10 according to an example embodiment of the present disclosure. Referring to FIG. 1, the multi-core system 10 may include a microcontroller unit (MCU) 100 and a monitoring device (ASIC; Application Specific Integrated Circuit) 200 configured to monitor the MCU 100.

The MCU 100 may include a plurality of cores 110, 120, and 130. Although three cores 110, 120, and 130 are shown in FIG. 1, it should be understood that the number of cores according to example embodiments of the present disclosure is not limited thereto. For ease of description, the present disclosure will now be described below using the three cores 110, 120, and 130. Among the plurality of cores 110, 120, and 130, at least one core is a main core 110 and the other cores are sub-cores 120 and 130.

The main core 110 may be implemented to perform main functions. In some embodiments, the main core 110 may conduct communication with the monitoring device 200 through a communication interface. For example, the communication interface may be a serial peripheral interface (SPI), an inter integrated circuit (I2C), a serial communication interface (SCI), an enhanced controller area network (eCAN) or the like.

The main core 110 may include a first question-answer circuit 112 configured to inform whether the main core 110 operates normally. The question-answer circuit 112 may be implemented to generate a first answer message A1 in response to a received first question message Q1. In some embodiments, the question message Q1 may be received from the monitoring device 200 according to a serial communication scheme (e.g., SPI). In example embodiments, the first question message Q1 may be a seed value and the first answer message A1 may be a key value.

In some embodiments, the first question-answer circuit 112 may further include a buffer configured to store the first question message Q1 or a buffer configured to store the first answer message A1.

Each of the sub-cores 120 and 130 may be implemented to perform auxiliary functions of the MCU 100 or perform alternate operations when the main core 110 does not operate normally.

The first sub-core 120 may include a second question-answer circuit 122 configured to inform whether the sub-core 120 operates normally. The second question-answer circuit 122 may be implemented to generate a second answer message A2 in response to a received second question message Q2. In some embodiments, the second question message Q2 may include the first answer message A1 from the main core 110.

In some embodiments, the second question-answer circuit 122 may further include a buffer configured to store a second question message Q2 or a buffer configured to store the second answer message A2.

The second sub-core 130 may include a first question-answer circuit 132 configured to inform whether the sub-core 130 operates normally. The third question-answer circuit 122 may be implemented to generate a third answer message A3 in response to a received third question message Q3. In some embodiments, the third question message Q3 may include a second answer message A2 from the first sub-core 120. In some embodiments, the third answer message A3 may be output to the main core 110.

In some embodiments, the third question-answer circuit 132 may further include a buffer configured to store the third question message Q3 or a buffer configured to store the third answer message A3.

The main core 110 may finally output the third answer message A3 to the monitoring device 200 in response to the first question message Q1 from the monitoring device 200. When the third answer message A3 indicates an error, the main core 110 may output the first answer message A1 and the second answer message A2 to the monitoring device 200 in response to a request of the monitoring device 200.

The monitoring device 200 may be implemented to monitor whether the MCU 100 operates normally. In some embodiments, the monitoring device 200 may be implemented as an application specific integrated circuit (ASIC).

In addition, the monitoring device 200 may be implemented to generate/output the question message Q1, receive the answer message A3, and determine whether the received answer messages A1, A2, and A3 indicate an error. Although not shown in FIG. 1, the monitoring device 200 may be implemented to count, store or reset the number of errors of each of the main core 110 and the sub-cores 120 and 130.

In some embodiments, the monitoring device 200 may generate instruction/signal to reset the main core 110 when the number of errors of the main core 110 is greater than or equal to a predetermined value.

In some embodiments, the monitoring device 200 may generate instruction/signal to reset the corresponding sub-cores 120 and 130 or set a flag to the corresponding sub-cores 120 and 130 when the number of errors of each of the sub-cores 120 and 130 is greater than or equal to a predetermined value.

The monitoring device 200 may be implemented to monitor the time from when the first question message Q1 is output to when the third answer message A3 is received and determine an operation of the MCU 100 when the monitored time is greater than the predetermined value, as an error. The monitoring device 200 may further include an associated watchdog timer.

As shown in FIG. 1, the MCU 100 and the monitoring device 200 of the multi-core system 10 are separated from each other. However, it should be understood that embodiments of the present disclosure are not limited thereto. It should be understood that the MCU 100 and the monitoring device 200 may be integrated into a single circuit.

In general, an MCU monitoring device is a watchdog. A watchdog receives a periodical signal from an MCU and transmits a reset signal in the case of an abnormal state. An electronic control unit (ECU) installed in a vehicle includes an MCU and a watchdog configured to monitor the MCU. Recently, ECUs to which a multi-core is applied are increasing as the role of an CMU becomes greater. However, a typical technology is to monitor each other's cores. In this case, reliability of MCU monitoring performed in a package may be reduced. A conventional technology is to monitor multi-core each other in a single package, so accurate monitoring may not be performed d a fault which may occur in the package.

Meanwhile, the multi-core system 10 according to an example embodiment of the present disclosure may monitor the multi-core (MCU) 100 by applying the monitor device (ASIC) 200 independent of the multi-core (MCU) 100. The monitoring device 200 may transmit a single or a plurality of watchdog requests (question messages), and the multi-core 100 transmits a response (answer message) to each core. With this manner, an operation state may be confirmed. There is no limitation in monitoring methods, and an error flag or reset signal may be generated according to a result of the answer message. Additionally, the multi-core 100 may set whether each core uses a watchdog.

Unlike a conventional technology to monitor multi-core each other, the multi-core system 10 according to an example embodiment of the present disclosure includes the monitoring device 200 configured to monitor each core at the outside of the multi-core (MCU) 100, thereby improving reliability of a monitoring operation.

FIG. 2 illustrates tables associated with operations of the question-answer circuits 112, 122, and 132 in FIG. 1. In the tables of FIG. 2, answer messages to answer message are exemplarily shown for ease of description. A table of an answer message to a question message may exist in another table form according to the question-answer circuits 112, 122, and 132.

Figure 3:
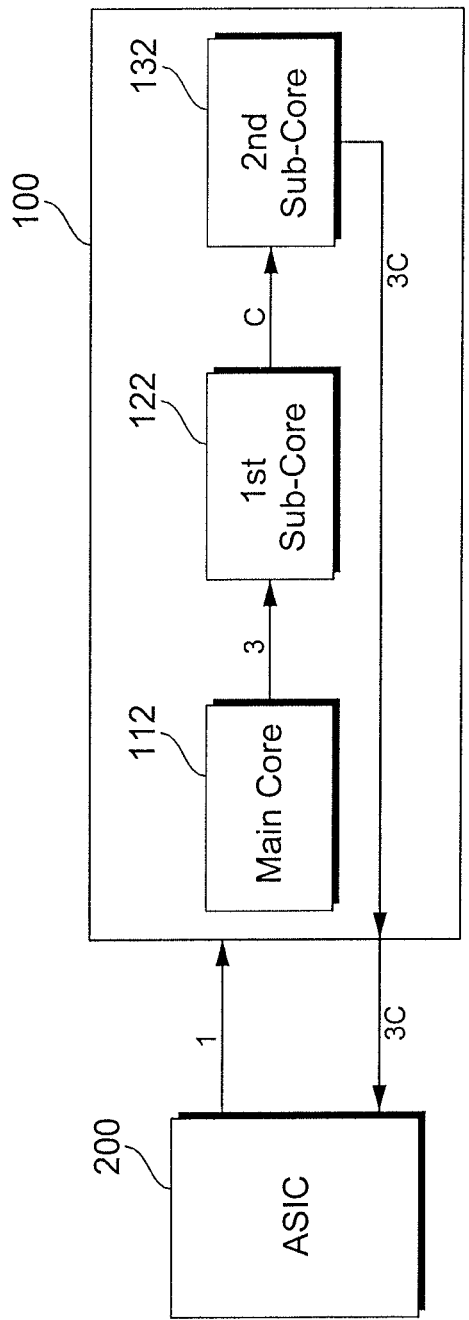
FIG. 3 illustrates the flow of a monitoring operation of a multi-core system when an error does not exist in the operation of an MCU.

FIG. 3 illustrates the flow of a monitoring operation of the multi-core system 10 when an error does not exist in the operation of the MCU 100. Referring to the tables of FIG. 2 and FIG. 3, the monitoring operation may be performed, as follows. The monitoring device 200 may transmit a question message A1 of '1' to a main core 110. A first question-answer circuit 112 of the main core 110 may receive the question message A1 of '1' and generate an answer message Q1 of '3' when the main core 110 operates normally. A second question-answer circuit 122 of a first sub-core 120 may receive a question message A2 of '3' and generate an answer message Q2 of 'C' when the first sub-core 120 operates normally. A question-answer circuit 132 of a second sub-core 130 may receive a question message A2 of 'C' and generate an answer message Q3 of '3C' when the second sub-core 130 operates normally.

Finally, the MCU 100 may output the answer message Q3 of '3C' to the monitoring device 200 in response to the question message A1 of '1'.

From the tables shown in FIG. 2, the monitoring device 200 may confirm the answer message Q3 of '3C' corresponding to the question message A1 to determine that the MCU 100 operates normally.

Figure 4:
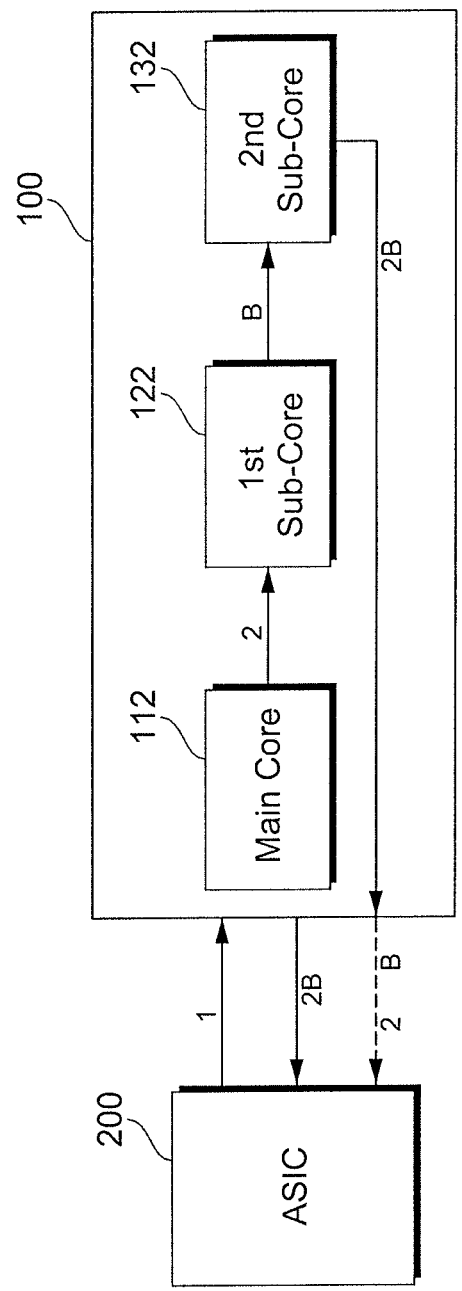
FIG. 4 illustrates the flow of a monitoring operation of a multi-core system when an error does not exist in the operation of an MCU.

FIG. 4 illustrates the flow of a monitoring operation of the multi-core system 10 when an error does not exist in the operation of the MCU 100. Referring to the tables of FIG. 2 and FIG. 4, the monitoring operation may be performed, as follows. The monitoring device 200 may transmit a question message A1 of '1' to a main core 110. For ease of description, it will be assumed that the main core 110 operates abnormally and the other cores 120 and 130 operate normally.

A first question-answer circuit 112 of the main core 110 may receive a question message A1 of '1' and generate another value, e.g., an answer message Q1 of '2', not an answer message Q1 of '3', because the main core 110 operate abnormally. A second question-answer circuit 122 of the first sub-core 120 may receive a question message A2 of '2' and generate an answer message Q2 of 'B' when the first sub-core 120 operates normally. A question-answer circuit 132 of the second sub-core 130 may receive a question message A2 of 'B' and generate an answer message Q3 of '2B' when the second sub-core 130 operates normally.

Finally, the MCU 100 may output an answer message Q3 of '2B' to the monitoring device 200 in response to the question message A2 of '1'.

The monitoring device 200 may confirm the answer message Q3 of '2B' corresponding to the question message A1 of '1' from the tables of FIG. 2 to determine that the MCU 100 operates abnormally.

When it is determined that an error exists in the operation of the MCU 100, the monitoring device 200 may request the first answer message A1 of the main core 110 and the second answer message A2 of the sub-core 120 to the MCU 100. The monitoring device 200 may receive a first answer message A1 of '2' and second answer message A2 of 'B' from the MCU 100 in response to the request. From the first answer message A1 of '2' and the second answer message A2 received using the tables shown in FIG. 2, the monitoring device 200 may determine that the operation of the main core 110 is abnormal and the operation of the sub-core 120 is normal.

The above-described error determination operation is merely exemplary, and it should be understood that an error of a core operation may be determined by various methods.

A multi-core system according to example embodiments of the present disclosure may be implemented such that each core selects whether or not to perform a monitoring operation of a monitoring device (watchdog).

Figure 5:
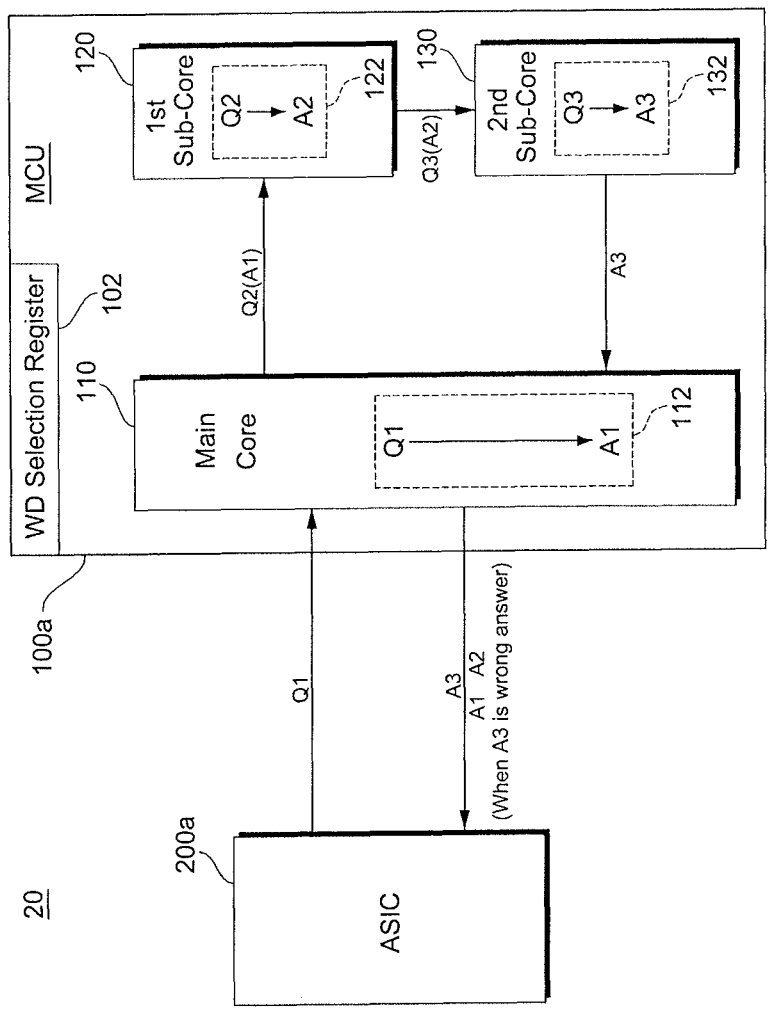
FIG. 5 illustrates a multi-core system according to another example embodiment of the present disclosure.

FIG. 5 illustrates a multi-core system 20 according to another example embodiment of the present disclosure. Referring to FIG. 5, the multi-core system 20 may include an MCU 100a and a monitoring device 200a. As compared to the multi-core system 100 shown in FIG. 1, the multi-core system 200 may further include a watchdog selection register 102 which stores a value to determine whether or not use monitoring operations of sub-cores 120 and 130. The watchdog selection register 102 may store a value indicating whether monitoring operations of cores in the MCU 100a are used. The monitoring device 200a may read a value stored in the watchdog selection register 102 and perform a monitoring operation of the MCU 100a in another manner depending on the stored value. In some embodiments, the monitoring device 200a may perform a monitoring operation on all cores 110, 120, and 130 in the MCU 100a, as shown in FIGS. 1 to 4, corresponding to the stored value. In other embodiments, the monitoring device 200a may perform some of the cores 110, 120, and 130 in the MCU 100a corresponding to the stored value. For example, some core may be the main core 110.

Figure 6:
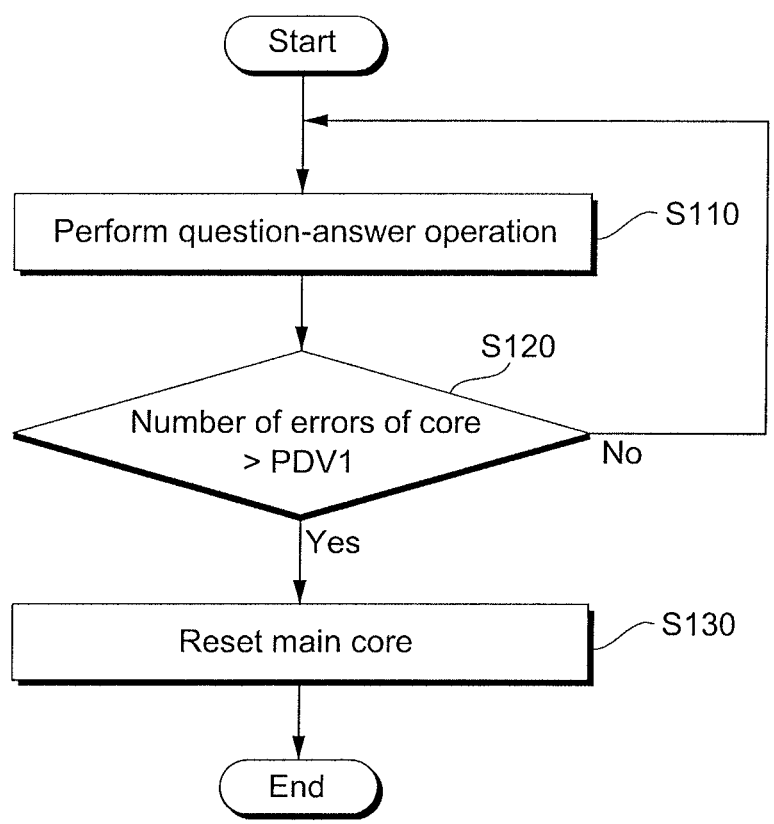
FIG. 6 illustrates a monitoring operation of a multi-core system according to an example embodiment of the present disclosure.

FIG. 6 illustrates a monitoring operation of a multi-core system according to an example embodiment of the present disclosure. Referring to FIGS. 1 to 6, the operation of the multi-core system 10 (see FIG. 1) may be performed, as follows.

Each of the main core 110 and a plurality of sub-cores 120 and 130 may perform a question-answer operation by serial communication, e.g., SPI (S110). A result value obtained by performing a final question-answer operation may be transmitted to the monitoring device 200, and the monitoring device 200 may determine whether the operation of the MCU 100 is normal or abnormal, according to an answer message of the final question-answer operation. When the operation of the MCU 110 is abnormal, answer messages A1 and A2 may be respectively received from the cores 110 and 120 to determine which one of the cores 110, 120, and 130 performs an abnormal operation. The number of errors of the core performing the abnormal operation may be accumulated. It is possible to determine whether the accumulated number of errors of the main core 110 is greater than or equal to a first reference value PDV1 (S120). When the number of errors of the main core 110 is greater than or equal to the first reference value PDV1, the monitoring device 200 may generate a reset signal to reset the main core 110 (S130).

Figure 7:
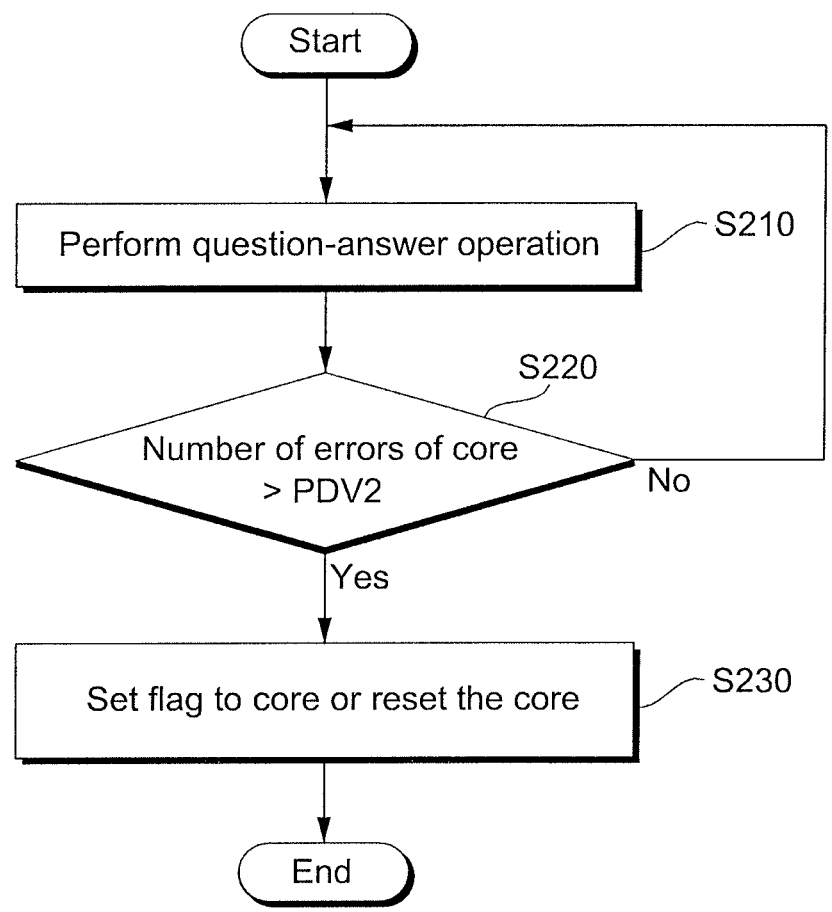
FIG. 7 illustrates a monitoring operation of a multi-core system according to another example embodiment of the present disclosure.

FIG. 7 illustrates a monitoring operation of a multi-core system according to another example embodiment of the present disclosure. Referring to FIGS. 1 to 7, the operation of the multi-core system 10 (see FIG. 1) may include S210 which is identical to S110 described in FIG. 6, performing a determination operation by a second reference value PDV2 which is identical to or different from the first reference value PDV1 of FIG. 6 (S220), and resetting a core or setting a flag to the core when the number of errors is greater than or equal to the second reference value PDV2 (S230).

Figure 8:
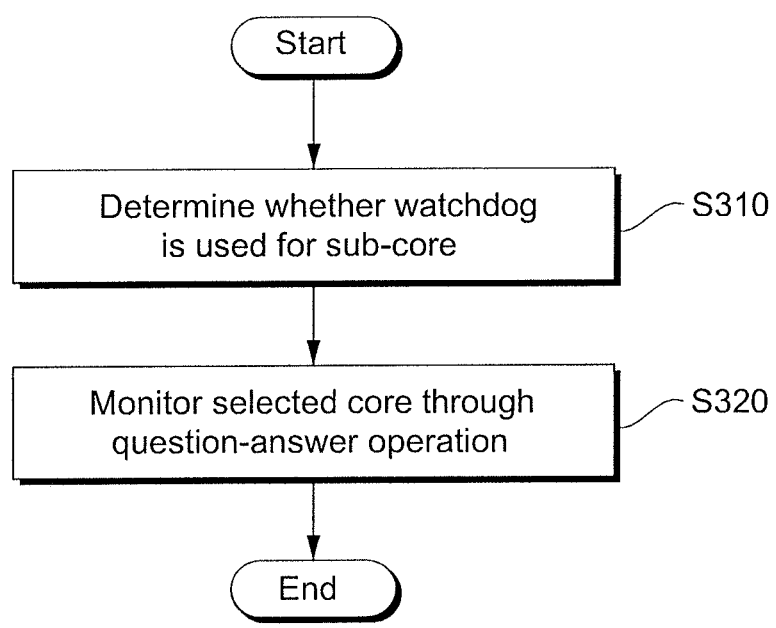
FIG. 8 illustrates a monitoring operation of a multi-core system according to another example embodiment of the present disclosure.

FIG. 8 illustrates a monitoring operation of a multi-core system according to another example embodiment of the present disclosure. Referring to FIGS. 5 to 8, the operation of a multi-core system 20 may be performed, as follows.

A monitoring device 200a (see FIG. 5) may read a value stored in the watchdog selection register 102 of the MCU 100a to determine whether a watchdog is used for sub-cores 120 and 130 (S310). The monitoring device 200a may perform a monitoring operation on a selected core through a question-answer operation (S320).

Figure 9:
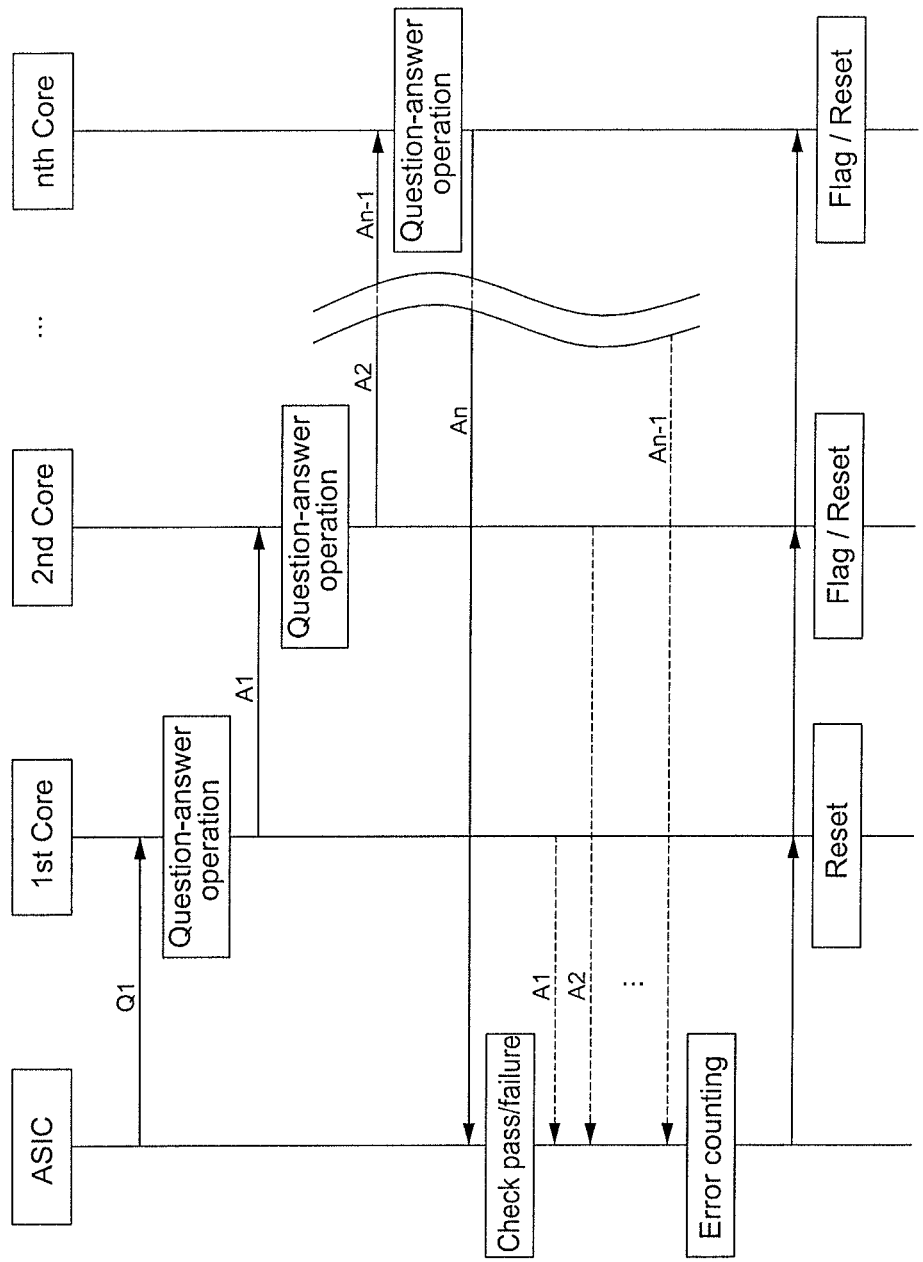
FIG. 9 illustrates a ladder diagram for a monitoring operation of a multi-core system according to an example embodiment of the present disclosure.

FIG. 9 illustrates a ladder diagram for a monitoring operation of a multi-core system according to an example embodiment of the present disclosure. Referring to FIGS. 1 to 9, a monitoring operation of a multi-core system may be performed, as follows.

An ASIC (watchdog) may transmit a question message Q1 to a first core. The first core may perform a question-answer operation in response to a question message Q1 to output a first answer message A1. A second core may receive the first answer message A1 from the first core and perform a question-answer operation in response to the first answer message A2 to output a second answer message A2. In this manner, an nth core may receive an (n−1)th answer message An−1 and perform a question-answer operation in response to the (n−1)th answer message to output a final answer message An.

The ASIC may analyze the received final answer message An to check pass/failure of a plurality of cores. That is, the ASIC may detect an error of each of the plurality of cores. When operations of the plurality of cores fail, the ASIC may request answer messages A1, A2, . . . , and An−1 from the other cores and analyze the answer messages A1, A2, . . . , and An−1 to determine a core where an error occurs. Error counting of the core where an error occurs may increase. Then, when the number of errors of the core is greater than or equal to a reference value, the core may be flag-set or reset.

As described above, each of a plurality of cores may be monitored independently according to a question-answer scheme to significantly improve reliability of a monitoring operation of a multi-core system.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure Although the present disclosure and its advantages have been described in detail, it should be understood that various changes, substitutions and alterations can be made herein without departing from the spirit and scope of the disclosure as defined by the following claims.

What is claimed is:

1. An operating method of a monitoring device configured to monitor a microcontroller unit including a plurality of cores, the operating method comprising:
   transmitting a question message to a first core among the plurality of cores;
   receiving an answer message from a second core among the plurality of cores;
   determining whether an operation of the microcontroller unit is abnormal, by using the answer message;
   receiving answer messages from cores, except for the second core, among the plurality of cores when only if the operation of the microcontroller unit is abnormal based on the answer message received from the second core; and
   detecting an error of each of the plurality of cores by using the received answer messages.

2. The operating method of claim 1, wherein the first core is a main core and the second core is a sub-core.

3. The operating method of claim 1,
   wherein each of the plurality of cores includes a question-answer circuit, and
   wherein the question-answer circuit receives an answer message from a question-answer circuit of an adjacent core as a question message, operates an answer message in response to the received question message, and transmits the operated answer message to a question-answer circuit of another adjacent core.

4. The operating method of claim 1, further comprising:
   resetting a corresponding core when a number of the errors is greater than or equal to a first reference value.

5. The operating method of claim 1, further comprising:
   setting a flag to a corresponding core or resetting the corresponding core when g number of the errors is greater than or equal to a predetermined reference value.

6. The operating method of claim 1, further comprising:
   monitoring an answer time until the answer message from the second core is received after the question message is transmitted.

7. The operating method of claim 6, further comprising:
   determining the operation of the microcontroller unit as an error when the answer time is greater than or equal to a predetermined value.

8. The operating method of claim 1, further comprising:
   selecting a core, among the plurality of cores, as the first core.

9. A multi-core system comprising:
   a microcontroller unit including a main core and sub-cores; and
   a monitoring device configured to monitor an operation of the microcontroller unit,
   wherein each of the main core and the sub-cores includes a question-answer circuit receiving a question message to generate an answer message,
   wherein an answer message of a first core among the main core and the sub-cores becomes a question message of a second core different from the first core,
   wherein the monitoring device performs a monitoring operation on a selected one of the main core and the sub-cores according to a question-answer scheme, and
   wherein the monitoring device transmits a question message to the main core receives an answer message of one of the sub-cores, determines whether the received answer message is a wrong answer, and receives answer messages from the other cores only if the received answer message is a wrong answer based on the answer message received from one of the sub-cores.

10. The multi-core system of claim 9, wherein the monitoring device conducts communication with the microcontroller unit according to a serial communication scheme.

11. The multi-core system of claim 9, wherein the monitoring device further comprises:
    a watchdog timer configured to monitor a time from when a question message is transmitted to the main core to when an answer message is received from the one sub-core.

12. The multi-core system of claim 9, wherein question-answer circuits of the main core and the sub-cores generate answer messages to question messages in different manners.

13. The multi-core system of claim 9, wherein the microcontroller unit further comprises:
    a watchdog selection register configured to store information on a selected core to perform a monitoring operation from the monitoring device among the main core and the sub-cores.

14. A multi-core system comprising:
    a microcontroller unit including a main core and sub-cores;
    a monitoring device configured to monitor an operation of the microcontroller unit; and
    a watchdog selection register configured to store information on a selected core to perform a monitoring operation from the monitoring device among the main core and the sub-cores,
    wherein each of the main core and the sub-cores includes a question-answer circuit receiving a question message to generate an answer message,
    wherein an answer message of a first core among the main core and the sub-cores becomes a question message of a second core different from the first core, and
    wherein the monitoring device performs a monitoring operation on a selected one of the main core and the sub-cores according to a question-answer scheme.

* * * * *